Patented Jan. 28, 1930

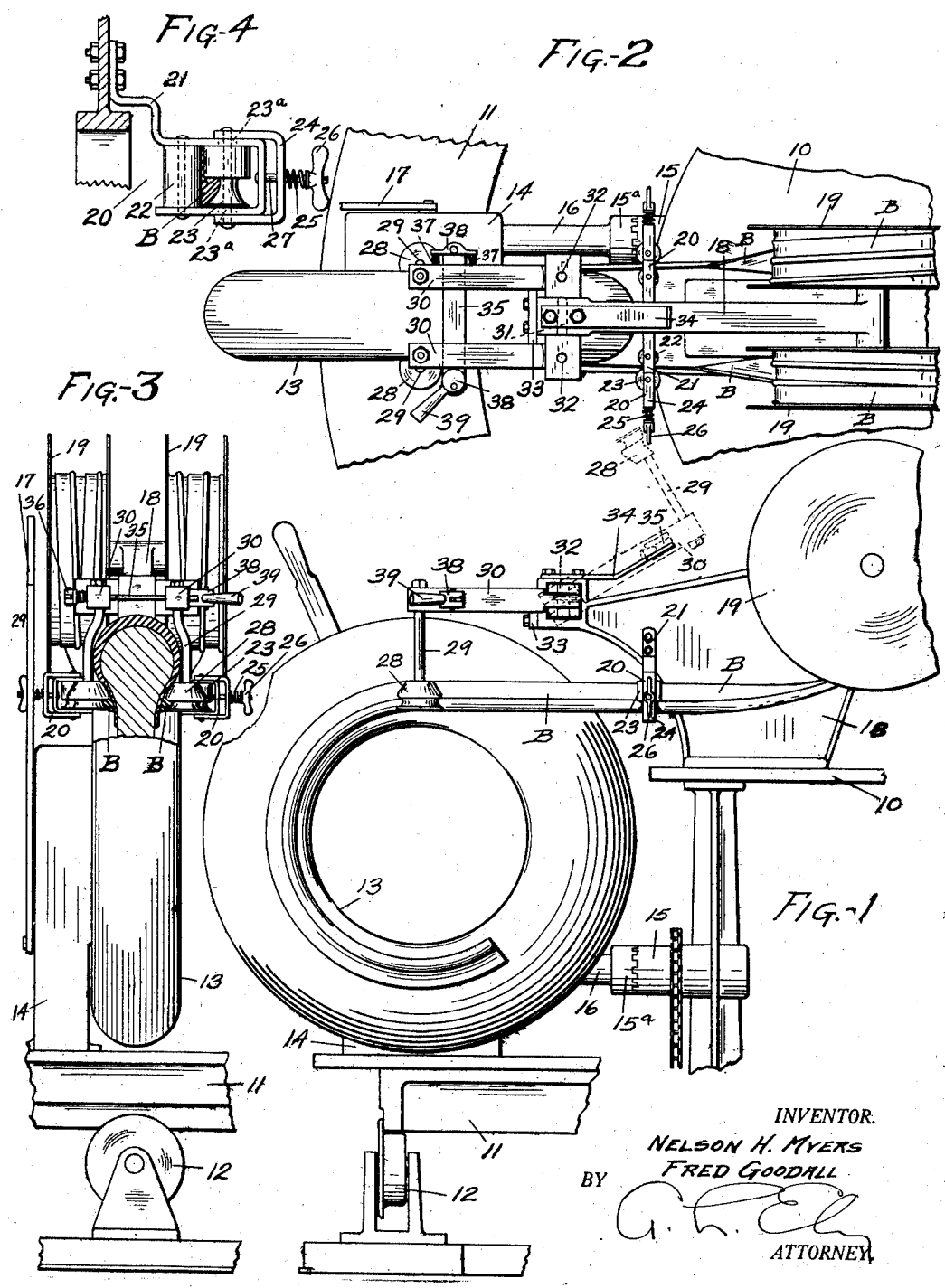

1,745,183

UNITED STATES PATENT OFFICE

NELSON H. MYERS AND FRED GOODALL, OF AKRON, OHIO, ASSIGNORS TO THE FIRESTONE TIRE AND RUBBER COMPANY, OF AKRON, OHIO, A CORPORATION OF OHIO

TIRE-BUILDING MACHINE

Application filed March 9, 1926. Serial No. 93,428.

This invention relates to tire building machines, and particularly to devices for applying bead material to tires.

The chief object of the invention is to provide means for applying clincher bead material in strip form to a tire building core.

A particular object of the invention is to provide, in combination with a rotary turret or table carrying a plurality of rotatable tire cores movable from one station to another, a bead applying device at one station for applying bead material in strip form to a core.

The foregoing and other objects of the invention are obtained by the construction illustrated in the accompanying drawings and described below. It will be understood that the invention is not limited to the specific form thereof shown and described.

Of the accompanying drawings,

Figure 1 is a side elevation of a core in a turret building machine, positioned at the bead applying station, and a side elevation of the bead applying device at said station;

Figure 2 is a plan thereof;

Figure 3 is a front elevation thereof, partly in section; and

Figure 4 is a detail of a bead-strip guide device employed therein.

In general, the device consists of a bracket adapted to be secured on the central support, about which the core carrying turret of a known type of tire building machine is intermittently rotated to carry the cores from one station to another for various tire building operations. In this type of building machine means are provided for rotating the core at each station and the above bracket carries bead strip reel supports, bead strip guides and a bead strip applying device for affixing both beads simultaneously on opposite sides of the core which is rotated at the bead applying station to draw the bead strips from the reels through the guiding and applying devices to progressively apply them on the core, the applying device being mounted so as to be moved into and away from cooperation with a core at the station in such a manner as to be effectively used in this type of apparatus.

Referring particularly to the drawings, 10 indicates a central fixed table or support under which the turret and core driving instrumentalities are housed. 11 represents the revoluble turret supported on bearing rollers such as 12 and adapted to be intermittently revolved to carry the cores from one station to another by suitable mechanism (not shown). One core 13 is shown in the bead applying station, it being supported on a bracket at 14 on turret 11 and rotated at said station by means of a power driven clutch member 15 journaled on table 10 and by which a shiftable core driving member 16 carrying a cooperating clutch member 15$^a$ is adapted to be driven, the member 14 being shiftable in a known manner by a lever 17.

Fixed onto table 10 at the bead applying station is a bracket 18 adapted to rotatably receive bead stock reels 19, 19 and having guiding devices 20, 20 suspended therefrom for directing the bead material from reels 19 onto the opposite sides of the core 13 adjacent its inner periphery at the upper portion thereof. Each guide device 20 comprises a bracket 21 secured on bracket 18 and depending therefrom, and on the inner side of which bracket 18 is vertically journaled a cylindrical roller 22 for engaging the inner surface of the bead material, and on the outer side of which bracket 18 is vertically journaled a roller 23 of a profile the reverse of that of the outer surface of the bead material so that it will fit snugly thereagainst, roller 23 being journaled in slots 23$^a$, 23$^a$ in bracket 21 and also in a bracket 24 slidable on bracket 21 and yieldingly urging roller 23 toward roller 22 by means of a compression spring 25 effective thereon, the force in spring 25 being determined by a wing nut 26 threaded onto a bolt 27 secured in bracket 21 and extending through bracket 24 and about which spring 25 is coiled.

The beads are necessarily applied to the partially constructed carcass of a tire on core 13 by application of pressure thereon. Accordingly, bead applying pressure rollers 28, 28 of a profile the inverse of the outer surface of the desired tire carcass at the beads are arranged to press the bead material against the core and to be moved away from the core during a turret rotating operation.

The rollers 28 are journaled on arms 29, 29 depending along the vertical center line of the core in operative positions from arms 30, 30 extending radially outwardly from bracket 18, arms 30 being pivoted at 31 to swing vertically as a unit into or away from positions whereby the rollers 28 may be operated against the sides of the core, and are also pivoted at 32, 32 so as to swing toward and from each other in their common plane so that they may be operated to clear the transverse cross-sectional or minor diameter of the core in moving to or from bead applying positions relative to the core. Stops 33 and 34 are provided respectively to hold the pressure roller unit in operative and non-operative positions.

The application of pressure by rollers 28 to the bead material is accomplished by extending a thrust member 35 through arms 30 and providing a head 36 on one end thereof connected to one arm by springs 37, 37, permitting arms 30 to move apart, and a rotatable cam 38 on the other end having a handle 39 and adapted to be operated against the other arm 30 to urge arms 30 together thus to press rollers 28 against core 13.

The operation of the machine will be readily understood from the foregoing description but may be briefly described as follows:

The turret 11 is revolved intermittently to position cores 13, on which the plies of the tire carcass have been applied, in succession at the bead applying station. Between each turret revolving movement the leading ends of the bead material, indicated at B, B, drawn from reels 19 and which are threaded through guiding devices 20, are manually applied to the opposite sides of the core in proper positions on the partly constructed carcass; the pressure roller unit is swung from the dotted line position to the full line position (Figure 1) and cam 38 is manually operated to urge rollers 28 against the leading ends of the bead material; the core is rotated one revolution (counter clockwise as shown in Figure 1), thus drawing the bead material through guides 20 and between rollers 28 and the core, the rollers 28 thus progressively affixing the bead material to the core; the pressure roller unit is swung back to dotted line position to be out of the way of the cores 13 when turret 11 is again revolved; the bead material is cut so that the ends of the bead strip may be spliced on the core; and finally the ends of the bead strips are spliced on the core in any suitable manner to finish the bead. During the bead applying operations, the other operations of building and finishing the tires are being accomplished at various other stations (not shown) about the turret 11.

Modifications of the invention may be resorted to without departing from the spirit thereof or the scope of the appended claims.

What is claimed is:

1. In tire building machines of that type comprising a revoluble turret carrying a plurality of rotatable cores, a bead applying station at which the cores are positioned in succession, a support inwardly of a core at said station, means on the support for receiving bead stock reels for supplying bead material for application to the opposite sides of a core at said station, bead strip guiding devices on said support for guiding the strips into proper relation with respect to the opposite sides of the core, a bead strip applying device comprising arms pivoted on said support to swing as a unit toward and from the periphery of the core and also pivoted to swing toward and from each other, arms depending from the first arms and carrying bead applying pressure rollers, and means carried by the first arms for urging them together but normally permitting them to move apart so that the pressure rollers may be actuated toward or from the bead portions of the core when the applying device is in operative relation thereto, said last-named means comprising a thrust member extending through the first named arms and yieldingly connected to one arm so as to permit the first-named arms to separate in passing the device into operative relation with respect to the core, said thrust member having a cam thereon adapted to be engaged with the other arm so as to urge the arms together, whereby the pressure rollers may be forced against the core from the opposite sides thereof.

2. In tire building machines of that type comprising a revoluble turret carrying a plurality of radially arranged rotatable cores, a bead applying station at which the cores are positioned in succession, a support inwardly of a core at said station, means on the support for receiving bead stock reels for supplying bead material for application to the opposite sides of a core at said station, bead strip guiding devices on said support for guiding the strips into proper relation with respect to the opposite sides of the core, a bead strip applying device comprising arms pivoted on said support to swing as a unit toward and from the periphery of the core and also pivoted to swing toward and from each other, arms depending from the first arms and carrying bead applying pressure rollers, and means carried by the first arms for urging them together but normally permitting them to move apart so that the pressure rollers may be actuated toward or from the bead portions of the core when the applying device is in operative relation thereto.

3. In tire building machines of that type comprising a revoluble turret carrying a plurality of radially arranged rotatable cores, a bead applying station at which the cores are positioned in succession, a support inwardly of a core at said station, means on the support for receiving bead stock reels for supplying bead material for application to the opposite sides of a core at said station, bead strip guiding devices on said support for guiding the strips into proper relation with respect to the opposite sides of the core, and a bead strip applying device comprising bead applying pressure rollers movable as a unit on said support into operative positions at the sides of the core and movable toward each other at said positions to apply pressure against the opposite sides of the core.

4. In tire building machines, a rotatable core, means for rotating the core, a support adjacent the core, a bead strip applying device operable on the core, said device comprising arms pivoted on said support to swing as a unit toward and from each other, other arms depending from the first named arms and carrying bead applying pressure rollers, and means carried by the first named arms for urging them together but normally permitting them to move apart so that the pressure rollers may be actuated toward or from the bead portions of the core when the applying device is in operative relation thereto, said last-named means comprising a thrust member extending through the first named arms and yieldingly connected to one arm so as to permit the first-named arms to separate in passing the device into operative relation with respect to the core, said thrust member having a cam thereon adapted to be engaged with the other arm so as to urge the arms together, whereby the pressure rollers may be forced against the core from the opposite sides thereof.

5. In tire building machines, a rotatable core, means for rotating the core, a support, a bead strip applying device operable on the core, said device comprising arms pivoted on said support to swing as a unit toward and from the periphery of the core and also pivoted to swing toward and from each other, arms depending from the first arms and carrying bead applying pressure rollers, and means carried by the first arms for urging them together but normally pemitting them to move apart so that the pressure rollers may be actuated toward or from the bead portions of the core when the applying device is in operative relation thereto.

6. In tire building machines of that type comprising a revoluble turret carrying a plurality of rotatable cores, a bead applying station at which the cores are positioned in succession, a support inwardly of a core at said station, a bead strip applying device comprising arms pivoted on said support to swing as a unit toward and from the periphery of the core and also pivoted to swing toward and from each other, arms depending from the first arms and carrying bead applying pressure rollers, and means carried by the first arms for urging them together but normally permitting them to move apart so that the pressure rollers may be actuated toward or from the bead portions of the core when the applying device is in operative relation thereto, said last-named means comprising a thrust member extending through the first-named arms and yieldingly connected to one arm so as to permit the first-named arms to separate in passing the device into operative relation with respect to the core, said thrust member having a cam thereon adapted to be engaged with the other arm so as to urge the arms together, whereby the pressure rollers may be forced against the core from the opposite sides thereof.

7. In tire building machines of that type comprising a revoluble turret carrying a plurality of radially arranged rotatable cores, a bead applying station at which the cores are positioned in succession, a support inwardly of a core at said station, a bead strip applying device comprising arms pivoted on said support to swing as a unit toward and from the periphery of the core and also pivoted to swing toward and from each other, arms depending from the first arms and carrying bead applying pressure rollers, and means carried by the first arms for urging them together but normally permitting them to move apart so that the pressure rollers may be actuated toward or from the bead portions of the core when the applying device is in operative relation thereto.

NELSON H. MYERS.
FRED GOODALL.